(12) United States Patent
Mensing et al.

(10) Patent No.: US 7,467,413 B2
(45) Date of Patent: Dec. 16, 2008

(54) METHOD AND APPARATUS FOR ACCESSING SESSION DATA

(75) Inventors: Joerg W. Mensing, Berlin (DE); Raymond A. Roedling, Berlin (DE); Robin Wissbrock, Berlin (DE)

(73) Assignee: SAP AG, Walldorf (DE)

( * ) Notice: Subject to any disclaimer, the term of this patent is extended or adjusted under 35 U.S.C. 154(b) by 912 days.

(21) Appl. No.: 11/017,141

(22) Filed: Dec. 20, 2004

(65) Prior Publication Data

US 2006/0137020 A1 Jun. 22, 2006

(51) Int. Cl.
*H04L 9/32* (2006.01)
(52) U.S. Cl. .......................................... 726/26; 726/27
(58) Field of Classification Search ............. 726/26–30, 726/2–7; 713/193
See application file for complete search history.

(56) References Cited

U.S. PATENT DOCUMENTS

| | | | |
|---|---|---|---|
| 5,661,800 A * | 8/1997 | Nakashima et al. | 726/27 |
| 5,721,943 A | 2/1998 | Johnson | |
| 5,832,484 A | 11/1998 | Sankaran et al. | |
| 6,192,370 B1 | 2/2001 | Primsch | |
| 7,131,133 B1 * | 10/2006 | Kawakura et al. | 725/25 |
| 2003/0167268 A1 | 9/2003 | Kumar et al. | |

OTHER PUBLICATIONS

Hoffmeister, Joerg, "SAP APO and SAP liveCache's New Backup and Recoverability Features Bolster High-Performance", SAP Developer Network, Dec. 19, 2003. [Retrieved Nov. 16, 2004]. Retrieved from Internet: URL:<https://www.sdn.sap.com/irj/servlet/prt/portal/jprtroot/com.sap.km.cm>. 6pgs.

* cited by examiner

*Primary Examiner*—Hosuk Song
(74) *Attorney, Agent, or Firm*—Buckley, Maschoff & Talwalkar LLC

(57) ABSTRACT

According to some embodiments, a method and apparatus for accessing session data includes identifying a data access request from a first process, the data access request for access to data associated with a second process, and determining, prior to allowing the first process to access the data, whether the second process is blocked.

6 Claims, 5 Drawing Sheets

METHOD AND APPARATUS FOR ACCESSING SESSION DATA

FIELD

Embodiments of the present invention relate to computing systems. More specifically, some embodiments relate to systems and methods for accessing session data in computing systems.

BACKGROUND

Computing systems frequently involve multiple processes or sessions operating in parallel. Often, one or more sessions require access to the same items of stored data. Competition between different sessions for the same stored data can result in collisions between the sessions and also can result in data errors and inconsistencies if not managed properly.

One solution to control data access by multiple sessions is to use cooperative task switching to only allow one active session at any time. Unfortunately, cooperative task switching using a single active session reduces processing speed and performance, especially on multiprocessor machines.

Another solution is to serialize data access by locking each data access session using a reader/writer lock. That is, when a first session accesses data, it causes a reader/writer lock to be imposed on the data to prevent another session from accessing the data during the time that the first session is accessing the data. Unfortunately, such a solution imposes processing overhead and can reduce system efficiency. For example, systems that use reader/writer locks require every session, including the session owning an item of data (the "data owning session"), to create a lock during access. This can result in significant overhead in situations where the data owning session frequently accesses the data, and can be particularly problematic where the data owning session frequently accesses the data but other sessions rarely access the data.

Accordingly, improved techniques for accessing session data are needed.

DETAILED DESCRIPTION

To alleviate problems inherent in the prior art, embodiments of the present invention introduce systems, methods, computer program code and means for accessing session data. For convenience, clarity and ease of exposition, a number of terms are used herein. For example, the term "session" will be used to refer to a process, thread or other routine performed with or under control by a computing device such as a server. Pursuant to some embodiments, the computing device is able to execute more than one session at any time, either due to multiple separated processors or by use of multiple virtual processors handled by preemptive task switching. As used herein, the terms "data owning session" or "owner" will be used to refer to the session owning, associated with, or controlling a particular item or unit of data.

The terms "friend session", "data accessing session" or "friend" will be used to refer to a session that does not own a particular item or unit of data, but is accessing the particular item or unit of data. Pursuant to some embodiments, multiple sessions may run at the same time (including a "data owning session" and a "friend session"). The terms "access mark" or "mark" will be used to refer to a flag, indicator, or other code associated with an item or unit of data to indicate that the data is in a particular state or condition. For example, pursuant to some embodiments, an "access mark" may be set to indicate that the data owning session is in a suspended condition. As used herein, "data" may refer to any type, amount, configuration or alignment of data, so long as the data is accessible by different sessions or processes. These and other terms used herein will be readily understood by those skilled in the art by reference to the following description, claims, and the attached drawings.

Figure 1:
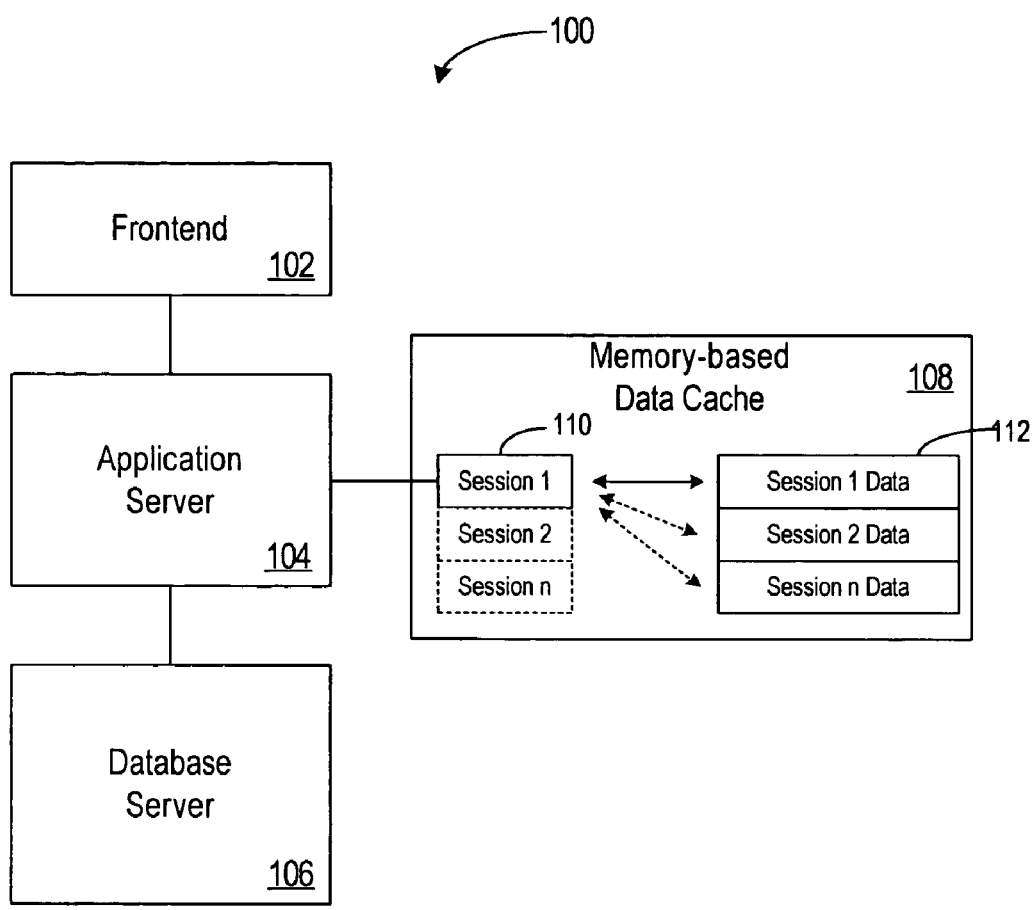
FIG. 1 is a diagram of a system utilizing features of some embodiments.

Features of embodiments will now be described by first referring to FIG. 1. FIG. 1 depicts a system 100 as one example of an environment in which features of the present invention may be implemented; those skilled in the art, upon reading this disclosure, will appreciate that features of the present invention may be implemented in a wide variety of computing systems.

The example system of FIG. 1 is shown to illustrate features of embodiments of the present invention. System 100 is a system designed to analyze and process large amounts of data and is an example of a type of system that may benefit from use of the present invention. For example, system 100 may a computing system operating the SAP® livecache system offered by SAP AG, Inc. of Walldorf, Germany.

System 100 includes a front end 102 in communication with an application server 104, which is in communication with a memory-based data cache 108 and a database server 106. Front end 102 may be configured to receive and transmit queries, commands and other requests between one or more client devices and application server 104. Application server 104 may be a server system implementing one or more applications, such as, for example, the database and business solution software offered by SAP AG, Inc. In the example system 100, application server 104 is in communication with data cache 108 and database server 106 to store and retrieve data responsive to queries or other requests received via front end 102. Some of the interactions may result in one or more sessions attempting to retrieve or access shared data.

For example, as illustrated, data cache 108 may include a number of different sessions 110 each of which may access a number of different items of session data 112. For illustration, the session 110 labeled as "session 1" may be associated with or "own" the data labeled as "session 1 data" and may, from time to time, require access to the data labeled as "session 2 data" (e.g., data owned by the session labeled "session 2").

Those skilled in the art will appreciate that other components of system 100 may also use features of the present invention to control access to session data. For example, embodiments may be used by database server 106 or application server 104. In general, any software system that is capable of operating with multiple sessions may use features of the present invention. A software system that allows cooperative session switching can use features of embodiments as a standard method for retrieving data owned by a single session.

Embodiments may be used in server code where multiple requests are handled on concurrently running processing units to monitor state information. In general, existing synchronization methods are too cost and resource intensive to be practical in such concurrent processing systems. Embodiments may also be used to modify online changeable parameters during runtime from a debugging monitor task.

Figure 2:
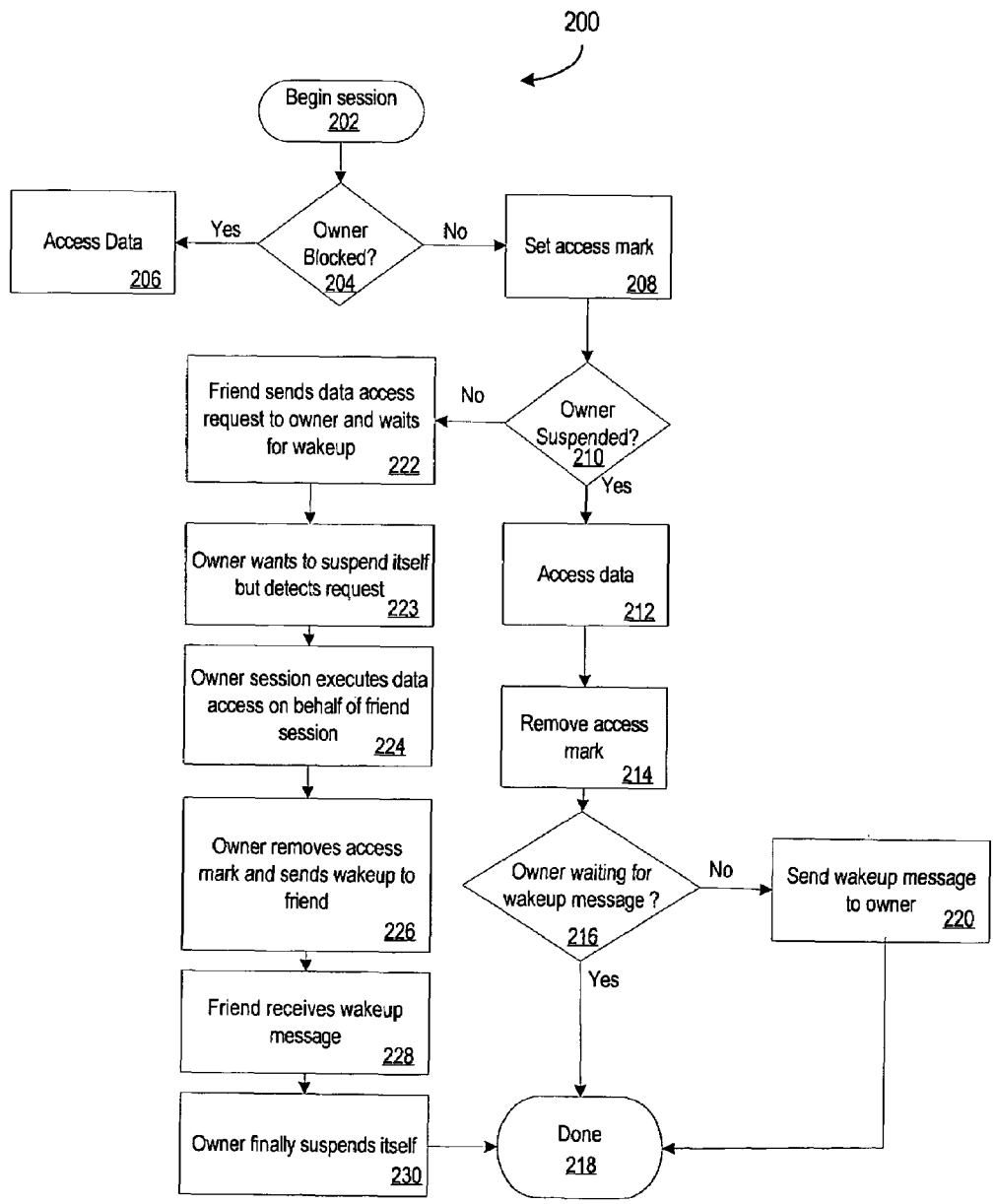
FIG. 2 is a flow diagram of process steps pursuant to some embodiments.

Reference is now made to FIG. 2. FIG. 2 is a flow chart of a session data access method 200 pursuant to some embodiments. Method 200 may be performed, for example, by or via a computing device (e.g., such as the system 100 of FIG. 1). The flow charts described herein do not imply a fixed order to the steps, and embodiments of the present invention may be performed in any order that is practicable.

Method 200 begins at 202 where a session begins. More particularly, a session at 202 is a "data accessing session" or a "friend session". A data accessing session may begin, for example, in response to a request received from an application server or in any of a number of other ways known to those of skill in the art. Processing at 202 includes identifying the data to be accessed by the data accessing session. Processing at 202 may also include identifying the session owning the data to be accessed.

Processing continues at 204 where a determination is made whether the owner session has been blocked. For example, an owner session is blocked if the data accessing session is certain that the owner session will be suspended during the period in which the data accessing session accesses the data. For example, this may occur when the owner session has been blocked by the data accessing session itself. A data accessing session can block a data owner session by using the convention that a lock must be acquired before accessing data, which is kept locked during the data access and released after data access is completed. If processing at 204 confirms that the owner is blocked from accessing the data, processing continues at 206 where the data accessing session performs the data access.

If processing at 204 indicates that the data owner session is not blocked, processing continues to 208 where an access mark associated with the data is set. For example, an access mark may be associated with the data via a control structure. As a specific example, an access mark "set" in a particular condition is used to indicate that a data access is pending for the data owner (thereby preventing other sessions from attempting to access the data). Processing continues at 210 where the data accessing session inquires whether the owner session is suspended or not. If the owner session is suspended, processing continues to 212 where the data accessing session accesses the data. If the owner session attempts to wake up and access the data during the time period in which the data accessing session is accessing the data, it first checks the access mark to see if it is able to wake up and access the data. If the access mark is still set in the condition indicating that a data access is pending, the owner session remains in a suspended condition until the access mark is removed.

Once the data accessing session has completed its data access, processing continues at 214 and the access mark is removed. Processing continues at 216 where a further determination is made whether the owner session is waiting for a wake-up message. This further determination is performed to ensure that the owner session remains suspended and did not attempt to access the data during the data access at 212. If the owner session is not waiting for a wake-up message (which indicates the access mark has been removed), but is still suspended for some other reason at 216, processing continues at 220 where a wake-up message is sent to the owner process, informing the owner process that the access mark has been removed and that the data access by the friend session is complete. If processing indicates that the owner session was suspended at 216, processing continues at 218 where the data access process is complete.

In some situations, processing at 210 may indicate that the owner session is not suspended, even after the access mark has been set. In such situations, processing continues at 222 where the friend session sends a data access request to the owner session and waits for a response. The data access request includes information needed for the owner session to execute the data access action on behalf of the friend session. That is, the friend session delegates the data access to the data owner.

Processing continues at 223 where the data owning session recognizes that a friend session has requested the data access and therefore delays suspending itself. At 224, the owner session executes the data access on behalf of the friend session.

Processing continues at 226 where the data owning session causes the access mark to be removed and sends a wake-up message to the friend. Processing continues at 228 where the friend session receives the wake-up message, allowing the friend session to continue running or run again. Finally, processing continues at 230 where the owner session suspends itself.

In this manner, embodiments provide improved techniques for controlling access to data by different sessions. For example, embodiments may be implemented with little or no computer code changes to many existing systems because the synchronization between sessions is independent from the data itself. For example, embodiments may be implemented in some systems by simply modifying the data access function (with little or no change to the data owning session). Pursuant to some embodiments, the data accessing session waits until the data owning session dispatches or suspends itself. That is, the owner of the data is associated with a higher priority, while a friend session must wait until the data owning session is suspended.

Figure 3:
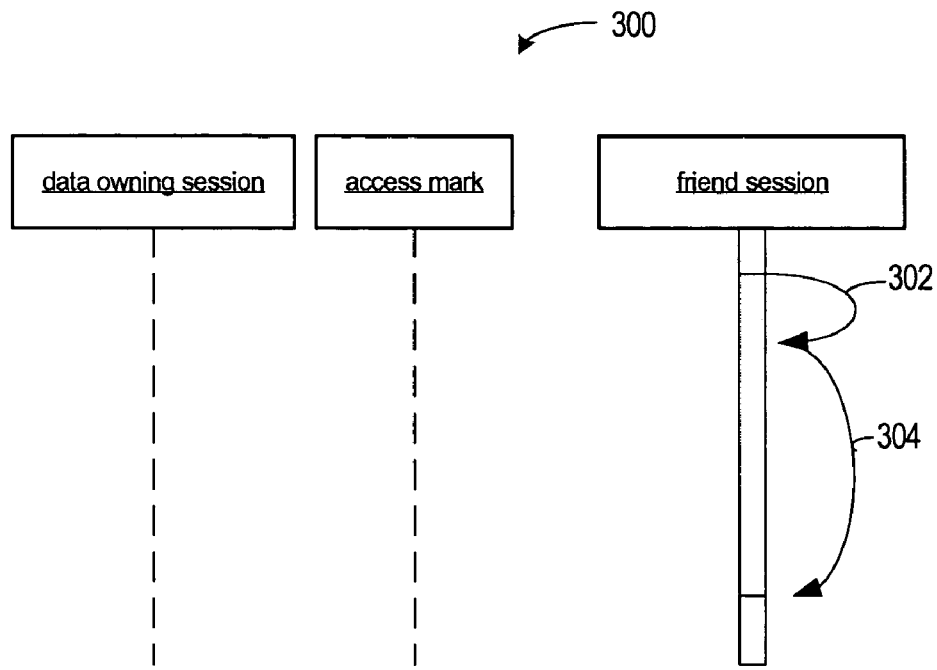
FIGS. 3-6 are session diagrams depicting data sessions supported by embodiments.

Reference is now made to FIGS. 3-6 where session diagrams are shown depicting the interaction between various components during a data access pursuant to embodiments disclosed herein. In particular, the process diagrams depict interaction between a data owning session, an access mark, and a friend session. Referring first to FIG. 3, a session 300 is shown representing the relatively simple case where a friend session is able to confirm that the data owning session will be suspended during the period that the data access is performed. For example, this may occur where the friend session is able to detect that the data owning session has been blocked by the friend session itself (e.g., where the friend session has placed a lock on the data). Session 300 includes step 302 where the friend session detects that the data owning session is blocked while the friend session is active. Step 304 represents the data access performed by the friend session.

Figure 4:
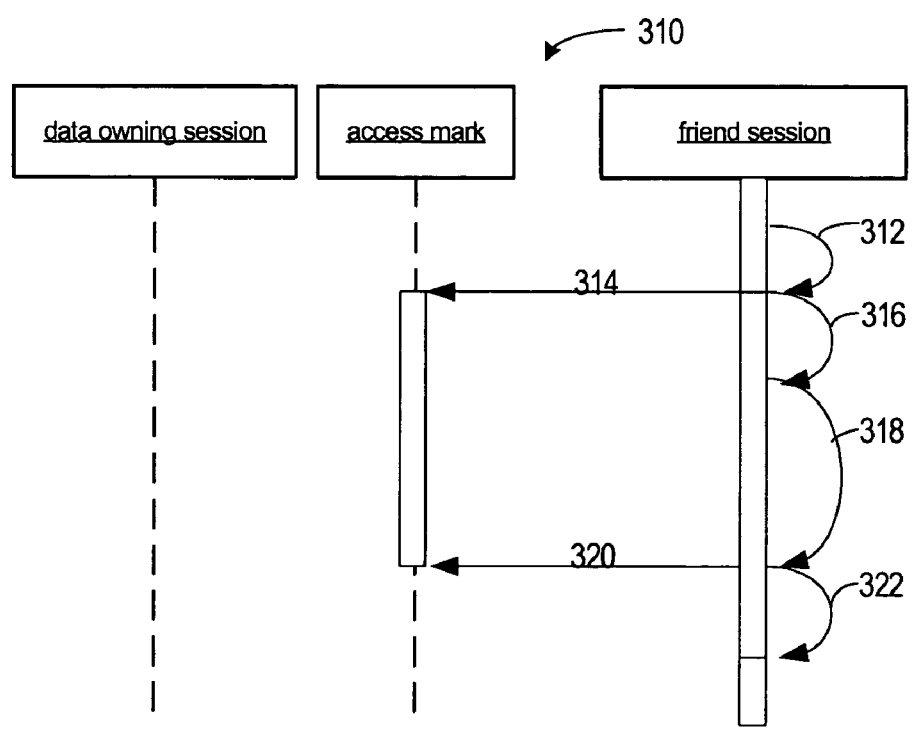

Referring now to FIG. 4, a session 310 is shown which represents the case where the friend session detects (at 312) that the owner session is not blocked. The friend session (at 314) marks that a data access is pending for the data owning session, and finds (at 316) that the data owning session is suspended. The access mark is visible to the data owning task, but in this example, the data owning task does not wake up during the period in which the friend session accesses the data (shown as 318). Once data access is completed, the friend session removes the access mark (at 320). To ensure that the data owning session has not been activated during the period in which the friend session was accessing the data, the friend session again checks to see that the data owning session is suspended at 322. Since the data owning session remains suspended, there is no collision and the data access process is complete.

Figure 5:
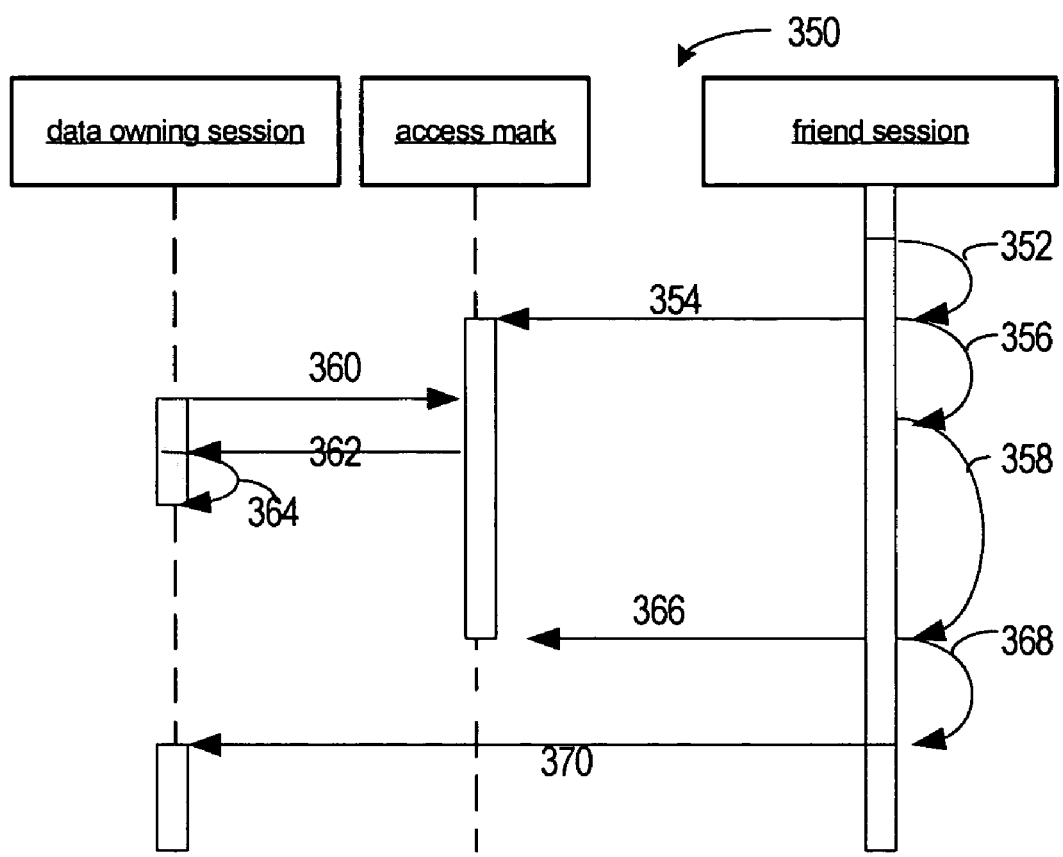

Referring now to FIG. 5, a session 350 is shown which represents a more complex case where the data owning session is found suspended but attempts to wake-up during the period in which the friend session is performing a data access.

At 352, the friend session detects that the owner session is not blocked, and the friend session creates an access mark at 354. At 356 the friend session confirms that the data owning session is suspended. However, in this process example, the data owning session attempts to wake up at 360 but finds out that the access mark for the data has been set (at 362). The data owning session places itself back in a suspended state at 364, waiting for a wake-up message from the friend session that indicates data access is done. At 358 the friend session performs the data access. Upon completion of the data access, the friend session removes the access mark at 366, and again confirms that the data owning session is suspended at 368. At 368, however, the friend session also detects that the data owning session is waiting for a wake-up message. At 370, a wake-up message is sent to the data owning session and the data owning session activates and is able to access the data.

Figure 6:
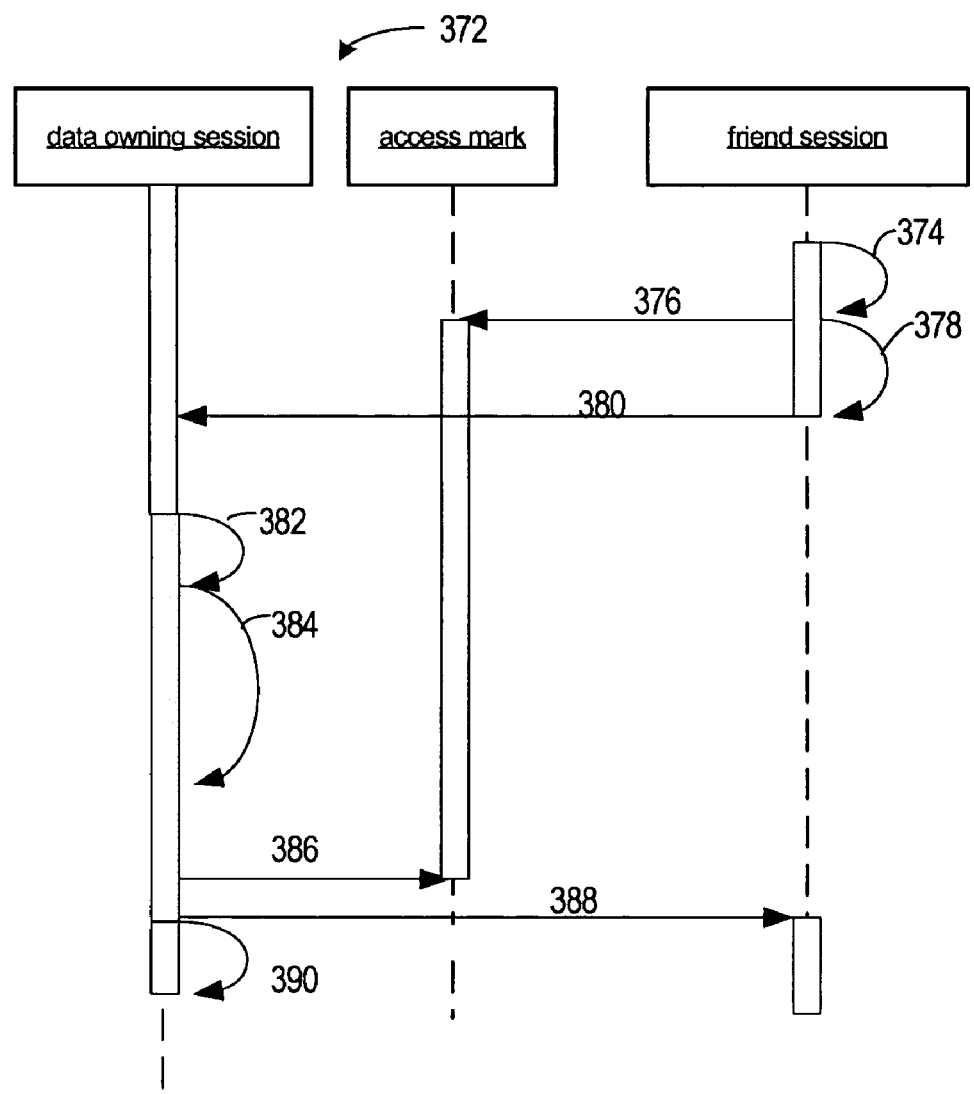

Referring to FIG. 6, a session 372 is shown which represents a further case where the data owning session is found running. Process 372 starts, like the other sessions discussed above, with the friend session detecting at 374 that the data owning session is not blocked. An access mark is set at 376 and the friend session attempts (at 378) to confirm that the data owning session is suspended. However, in this example, the friend session learns that the data owning session is not suspended, but is instead active and running. The friend session sends a data access message (at 380) to the data owning session containing all information needed for the data owning session to execute the data access action on behalf of the friend session. The data owning session performs the data access action at 384. Upon completion of the data access, the data owning session removes the access mark set by the friend session (at 386), and sends a wake-up message to the friend session to let the friend session run again. Finally, at 390, the data owning session suspends itself.

Briefly referring again to FIG. 1, some or all of the devices of system 100 may be computing devices such as, for example, one or more personal computers, servers, workstations, or the like. Each device may include one or more microprocessors used to execute processor-executable process steps so as to perform the session access processes described herein. Each device may include one or more communication ports used to transmit and to receive data from other devices, including I/O devices, other devices of system 100, or the like. Some or all of the devices of system 100 may be in communication via one or more communication networks or protocols, including, for example, a local area network, a wide area network, a telephone network, a cellular network, a fiber-optic network, a satellite network, an infrared network, a radio frequency network, and any other type of network that may be used to transmit information between devices. These various elements are known to those skilled in the art and are therefore not shown in detail herein.

Although the present invention has been described above with respect to some embodiments thereof, it should be noted that the above-described embodiments may be altered to create completely or partially different embodiments without departing from the spirit and scope of the appended claims.

What is claimed is:

1. A method comprising:
identifying, in a computing device that includes a processor, a data access request from a first process, the data access request for access to data associated with a second process, wherein said second process is configured to suspend itself after performing a data access; and
determining in the computing device, prior to allowing said first process to access said data, whether said second process is blocked;
wherein said determining indicates that said second process is not blocked, the method further comprising:
setting an access mark associated with said data;
determining that said second process is suspended after setting said access mark;
allowing said first process to access said data;
removing said access mark associated with said data after said first process accesses said data;
determining, after removing said access mark, that said second process is not suspended; and
sending a wake-up message to said second process.

2. A method comprising:
identifying, in a computing device that includes a processor, a data access request from a first process, the data access request for access to data associated with a second process, wherein said second process is configured to suspend itself after performing a data access; and
determining in the computing device, prior to allowing said first process to access said data, whether said second process is blocked;
wherein said determining indicates that said second process is not blocked, the method further comprising:
setting an access mark associated with said data;
determining that said second process is not suspended after setting said access mark;
causing said second process to access said data on behalf of said first process; and receiving a wake-up message and said data from said second process.

3. An apparatus, comprising:
a memory storing processor-executable process steps; and
a processor in communication with the memory and operative in conjunction with the stored process steps to:
identify a data access request from a first process, the data access request for access to data associated with a second process, wherein said second process is configured to suspend itself after performing a data access; and
determine, prior to allowing said first process to access said data, whether said second process is blocked;
wherein the processor in conjunction with the stored process steps determines that said second process is not blocked, the processor further operative in conjunction with the stored process steps to:
set an access mark associated with said data;
determine that said second process is suspended after the access mark is set; and
allow said first process to access said data;
wherein the processor is further operative in conjunction with the stored process steps to:
remove said access mark;
determine, after removing said access mark, that said second process is not suspended; and
cause said first process to send a wake-up message to said second process.

4. An apparatus, comprising:
a memory storing processor-executable process steps; and
a processor in communication with the memory and operative in conjunction with the stored process steps to:
identify a data access request from a first process, the data access request for access to data associated with a second process, wherein said second process is configured to suspend itself after performing a data access; and
determine, prior to allowing said first process to access said data, whether said second process is blocked;
wherein the processor in conjunction with the stored process steps determines that said second process is not blocked, the processor further operative in conjunction with the stored process steps to:
set an access mark associated with said data;
determine that said second process is not suspended after the access mark is set;
cause said second process to access said data on behalf of said first process;
wherein the processor is further operative in conjunction with the stored process steps to:
cause said second process to send a wake-up message and said data to said first process.

5. A medium storing processor-executable process steps, the process steps comprising:
a step to identify a data access request from a first process, the data access request for access to data associated with a second process, wherein said second process is configured to suspend itself after performing a data access; and
a step to determine, prior to allowing said first process to access said data, whether said second process is blocked;
wherein the process step to determine indicates that said second process is not blocked, the process steps further comprising:
a step to set an access mark associated with said data;
a step to determine that said second process is suspended after the access mark is set; and a step to allow said first process to access said data;
the process steps further comprising:
a step to remove said access mark;
a step to determine, after removing said access mark, that said second process is not suspended; and
a step to cause said first process to send a wake-up message to said second process.

6. A medium storing processor-executable process steps, the process steps comprising:
a step to identify a data access request from a first process, the data access request for access to data associated with a second process, wherein said second process is configured to suspend itself after performing a data access; and
a step to determine, prior to allowing said first process to access said data, whether said second process is blocked;
wherein the process step to determine indicates that said second process is not blocked, the process steps further comprising:
a step to set an access mark associated with said data;
a step to determine that said second process is not suspended after the access mark is set;
a step to cause said second process to access said data on behalf of said first process; the process steps further comprising:
a step to cause said second process to send a wake-up message and said data to said first process.

* * * * *